(12) United States Patent
Uan-Zo-Li et al.

(10) Patent No.: US 10,020,665 B2
(45) Date of Patent: Jul. 10, 2018

(54) POWER DELIVERY SYSTEM

(71) Applicant: INTEL CORPORATION, Santa Clara, CA (US)

(72) Inventors: Alexander B. Uan-Zo-Li, Hillsboro, OR (US); Patrick K. Leung, Hillsboro, OR (US); Tod F. Schiff, Portland, OR (US); Scot Lester, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 138 days.

(21) Appl. No.: 14/282,059

(22) Filed: May 20, 2014

(65) Prior Publication Data

US 2015/0340897 A1 Nov. 26, 2015

(51) Int. Cl.
*H02J 7/00* (2006.01)
*G01R 31/36* (2006.01)

(52) U.S. Cl.
CPC .......... *H02J 7/0054* (2013.01); *H02J 7/0004* (2013.01); *H02J 7/0068* (2013.01); *H02J 7/0073* (2013.01)

(58) Field of Classification Search
CPC .............................. H02J 7/0054; H02J 7/0068
USPC ......................................................... 320/103
See application file for complete search history.

(56) References Cited

U.S. PATENT DOCUMENTS

| | | | | | |
|---|---|---|---|---|---|
| 5,576,611 | A * | 11/1996 | Yoshida | ................ | H01M 10/44 320/152 |
| 6,075,343 | A * | 6/2000 | Hsu | ....................... | H02J 7/0031 320/106 |
| 2003/0178967 | A1 * | 9/2003 | Khatri | ................... | G06F 1/3203 320/103 |
| 2007/0188134 | A1 * | 8/2007 | Hussain | ................ | H01M 10/44 320/114 |
| 2007/0194626 | A1 * | 8/2007 | Eager | .................... | H02J 7/0068 307/66 |
| 2008/0157723 | A1 * | 7/2008 | Xing | ........................ | H02J 7/022 320/164 |
| 2008/0197801 | A1 * | 8/2008 | Manor | .................. | H02J 7/0054 320/103 |
| 2008/0278119 | A1 * | 11/2008 | Veselic | ................. | H02J 7/0022 320/161 |
| 2009/0107743 | A1 * | 4/2009 | Alston | ............... | B60H 1/00428 180/65.21 |
| 2009/0195214 | A1 * | 8/2009 | Gehrke | ................. | H02J 7/0068 320/137 |
| 2009/0309419 | A1 * | 12/2009 | Yamasaki | ............... | G06F 1/263 307/39 |
| 2010/0164440 | A1 * | 7/2010 | Ikeda | ..................... | H02J 7/0054 320/162 |
| 2010/0320971 | A1 * | 12/2010 | Zhu | ........................ | H02J 7/0042 320/134 |
| 2012/0074894 | A1 * | 3/2012 | Chen | ..................... | B60L 11/005 320/103 |
| 2012/0229074 | A1 * | 9/2012 | Seethaler | .............. | H02J 7/0021 320/107 |
| 2014/0191724 | A1 * | 7/2014 | Wojcik | ................. | H05K 5/0086 320/114 |

* cited by examiner

*Primary Examiner* — Samuel Berhanu
*Assistant Examiner* — Tarikh Rankine
(74) *Attorney, Agent, or Firm* — Schwabe, Williamson & Wyatt, P.C.

(57) ABSTRACT

An electronic apparatus may include a charger device to obtain information relating to a first battery, and to set a limit of a battery charge current of a second battery based on the obtained information.

15 Claims, 5 Drawing Sheets

POWER DELIVERY SYSTEM

BACKGROUND

Field

Embodiments may relate to a power delivery system for an electronic device.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

Embodiments may relate to a power delivery system for an electronic device/system. The electronic device/system may be part of a load and/or may be part of a separate device.

The electronic device may be any one of a mobile terminal, a mobile device, a mobile computing platform, a mobile platform, a laptop computer, a tablet, an ultra-mobile personal computer, a mobile Internet device, a smartphone, a personal digital assistant, a display device, a television (TV), etc. The electronic device may be an electronic apparatus.

Figure 1:
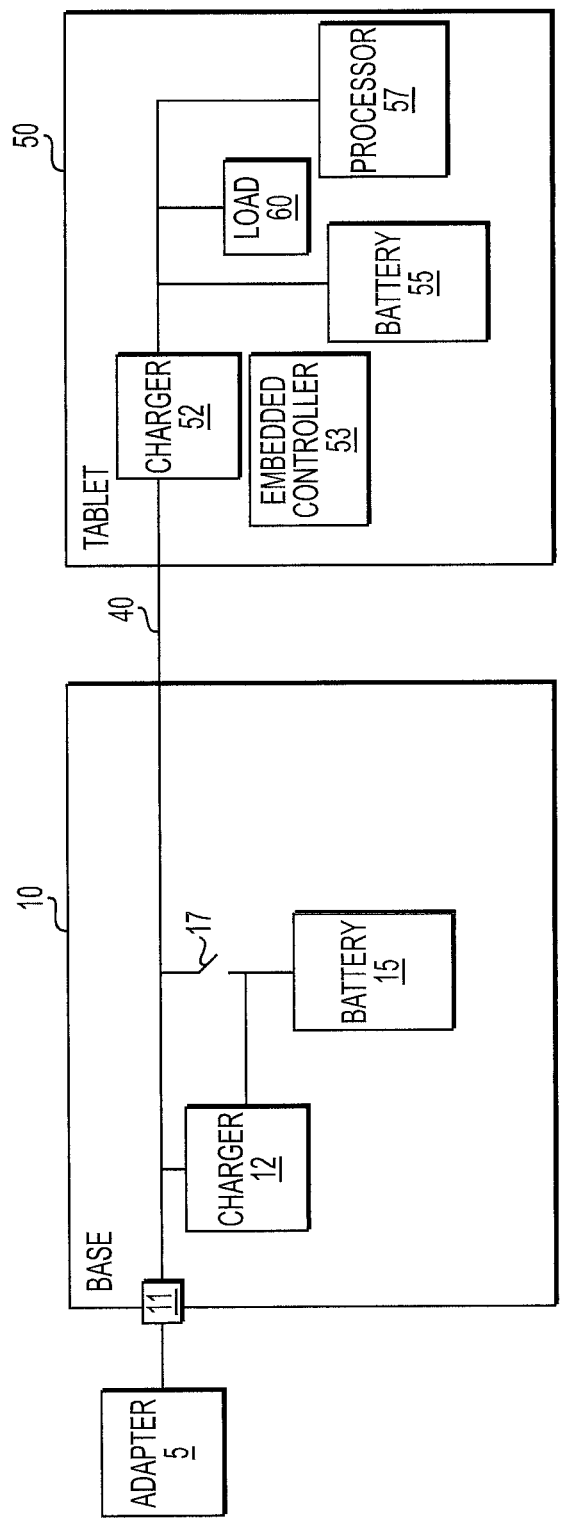
FIG. 1 shows an electronic system according to an example arrangement.

FIG. 1 shows an electronic system according to an example arrangement. Other arrangements may also be provided. The electronic system may include a power delivery system.

FIG. 1 shows an electronic system that includes a base 10 (or base component) and a tablet 50 (or tablet component). The electronic system may include a power delivery system. The tablet 50 may connect to the base 10, and may disconnect from the base 10. The base 10 and the tablet 50 may be considered a detachable system.

As shown in FIG. 1, the base 10 may include a charger 12 and a battery 15. The battery 15 may be provided within a battery port, for example. The battery 15 may also be referred to as a base battery.

The charger 12 may be a base charger to charge the battery 15. In at least one arrangement, the charger 12 may be a Hybrid Power Boost (HPB) charger.

The system may also include an alternative current (AC) adaptor 5 to electrically connect with an input port 11 of the base 10. The adaptor 5 may provide power to the base 10 and to the tablet 50.

As shown in FIG. 1, the tablet 50 may include a charger 52, a battery 55, a load 60 and a processor 57. The tablet 50 may also include an embedded controller (EC) 53. The battery 55 may be provided within a battery port, for example. The battery 55 may also be referred to as a tablet battery.

The load 60 may include any of a number of different electrical components. For example, the load 60 may include a display, a speaker, a camera, a memory and a microphone. The load 60 may include a system platform and/or a system-on-chip (SOC). The processor 57 may also be considered as part of the load 60. More or less components may be part of the load 60.

The processor 57 may perform an operation on a component of the load 60.

The charger 52 may be considered a tablet charger for the battery 55 and other components of the tablet 50. The charger 52 may be a Narrow $V_{DC}$ (NVDC) charger. The charger 52 may operate such that when the base 10 is connected to the tablet 50, then power from the base 10 may be provided through the charger 52 and to other components of the tablet 50. On the other hand, when the base 10 is not connected to the tablet 50, then the tablet battery 55 may provide power to the load 60 and/or other components of the tablet 50.

The base 10 may charge the tablet 50 when the tablet 50 is connected to the base 10. For example, the tablet 50 may receive power from the base 10 when the base 10 is physically connected to the tablet 50 by a connector 40, such as a physical connector. In one arrangement, the tablet 50 may receive power from the base battery 15 when a switch 17 is closed. In another arrangement, the tablet 50 may receive power from the adapter 5 connected to the input port 11.

The base 10 and the tablet 50 may be independently charged when the tablet 50 is detached from the base 10.

In at least one arrangement, the base battery 15 may be much smaller (in terms of power capacity) than the tablet battery 55.

The system of FIG. 1 may include a plurality of modes (or a plurality of operations). The different modes may be based on whether or not an adapter is connected to the base 10 (or possibly to the tablet 50), whether or not the tablet 50 is docked (or connected) to the base 10, and/or whether or not the base battery 15 is being used to charge the tablet battery 55.

The system may be provided in a turbo boost mode (or a turbo boost operation) that may drastically increase a frequency of the processor 57 when there is a thermal margin on the tablet 50 (or tablet platform). The thermal margin may be a range of safe operating temperatures. As one example, the power consumption of the processor 57 may drastically exceed a thermal design level, and a total platform consumption (on the load 60) may also exceed capabilities of the AC adapter 5 and/or the base battery 15.

Figure 2:
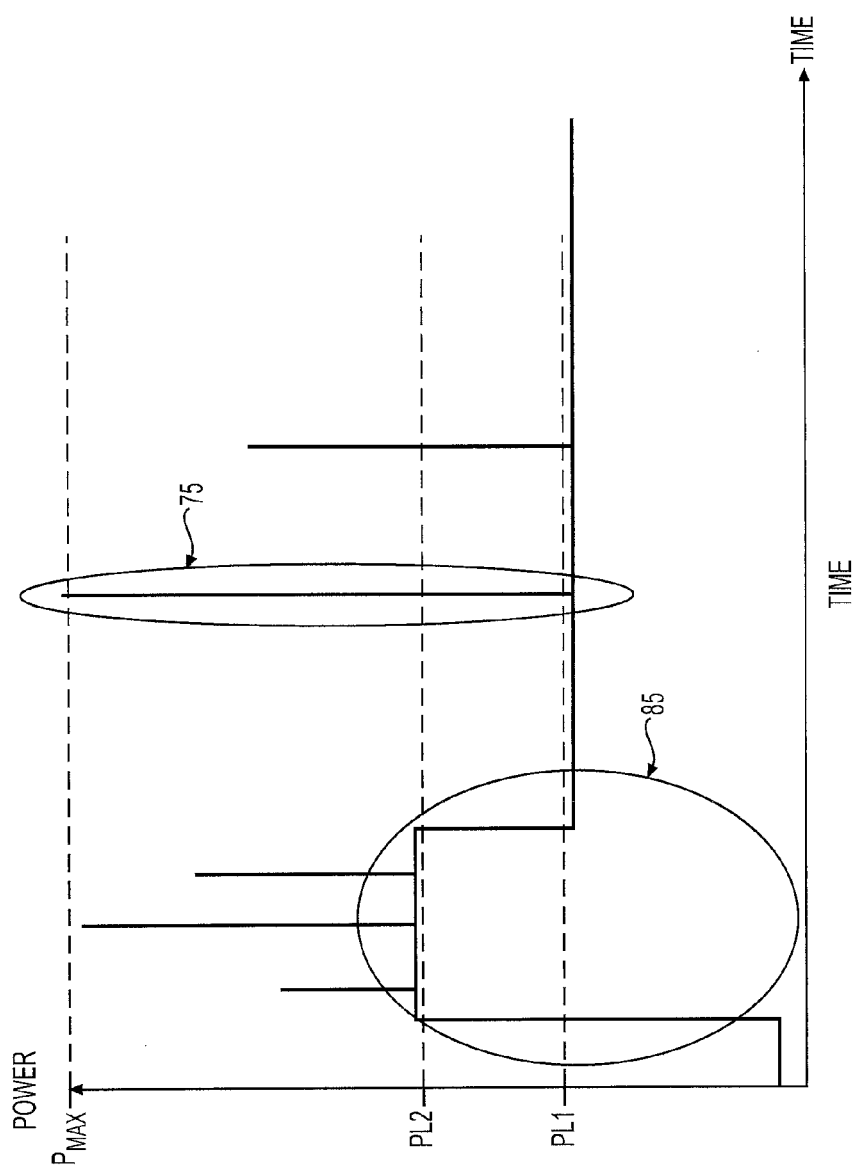
FIG. 2 is a graph showing a turbo operation according to an example arrangement.

FIG. 2 is a graph showing turbo operation according to an example arrangement. Other arrangements and graphs may also be provided.

The graph of FIG. 2 shows an x-that axis represents time, and a y-axis that represents power. FIG. 2 also shows three different power levels, namely a first power level PL1, a second power level PL2 and a maximum power level $PL_{max}$.

The first power level PL1 may be power consumption by the load, a platform and/or a system-on-chip (SOC) that may be sustained indefinitely. The second power level PL2 may relate to a turbo level that may be maintained for a small amount of time. The second power level PL2 may be higher that the sustained power of the first power level PL1. The second power level PL2 may be provided when a temperature (of a part of the system) is below a prescribed limit. The maximum power level $PL_{max}$ is a level that may be achieved by the load, the platform and/or the SOC for a small duration of time (e.g. less than 10 ms) and the frequency may be lowered in order to exit from this level (or mode).

FIG. 2 also shows a first turbo spike 75 and a second turbo spike 85. The first turbo spike 75 may be a spike of very high power and may have very limited duration, such as 10 milliseconds (ms), for example. The second turbo spike 85 may be of medium power, but may have a much longer duration. The power system may support these spikes without the AC adapter shutting down and/or without the batteries running out of power.

Disadvantageous problems may occur due to very high turbo levels as well as due to charging of the tablet battery. These may be described with respect to two system arrangements, namely a first system arrangement and a second system arrangement.

A first system arrangement may include the tablet 50 being docked to the base 10, the base battery 15 being fully discharged, the tablet battery 55 being fully discharged and the adapter 5 being connected to the base 10.

In the first system arrangement, a maximum turbo power may be greater than a thermal design power (TDP) of the adapter even when the maximum current $I_{ccmax}$ of the processor 57 is limited to a minimum allowable value (of the load, the platform or the SOC). The thermal design power TDP may be a maximum amount of heat that may be provided in order to keep components within their thermal margin.

An input current limit of the charger 52 may be a value of the adapter thermal design power (TDP). If the tablet battery 55 is fully discharged (or is discharged too low enough level to not support any discharge) then all the power must be provided from the base 10. The tablet charger 52 may limit an amount of power transferred from the base 10 to the tablet 50 to a value that is below the turbo spike (or turbo). Accordingly, in this arrangement, the system/device may shut down during a turbo pulse (or turbo spike).

A second system arrangement may include the tablet 50 being docked to the base 10, the tablet battery 55 being fully discharged, the base battery 15 being charged, and no adapter being coupled to the base 10.

In the second system arrangement, the base battery 15 may provide 20 watts (W) of continuous power, for example, while a power spike in a turbo mode may be 50 W, for example. FIG. 2 shows the second turbo spike 85 between the first power level PL1 and the second power level PL2.

In the second system arrangement, the base battery 15 may charge the tablet battery 55 when the power consumption is low enough. However, this may not satisfy user demands, and a resulting performance may be either greatly limited, and/or the system may shut down unexpectedly.

Embodiments may provide an electronic system, an electronic device and/or a power delivery system that may feature firmware, hardware and/or software that may overcome or resolve problems of disadvantageous system arrangements.

A system performance ($I_{ccmax}$) may be limited so that a total peak power consumed by a platform (or the load or the SOC) may be less than an input power limit of the tablet charger 52. The second power level PL2 may be limited by the base battery TDP. An input current limit of the tablet charger 52 may be set to the maximum system power (or system peak power). If the second power level PL2 and the charging power of the tablet battery 55 are greater than the base battery TDP, then the following embodiments or implementation may be provided.

Embodiments may control powering of the tablet 50 such that the output current of the base battery 15 is limited to a rated value.

Figure 3:
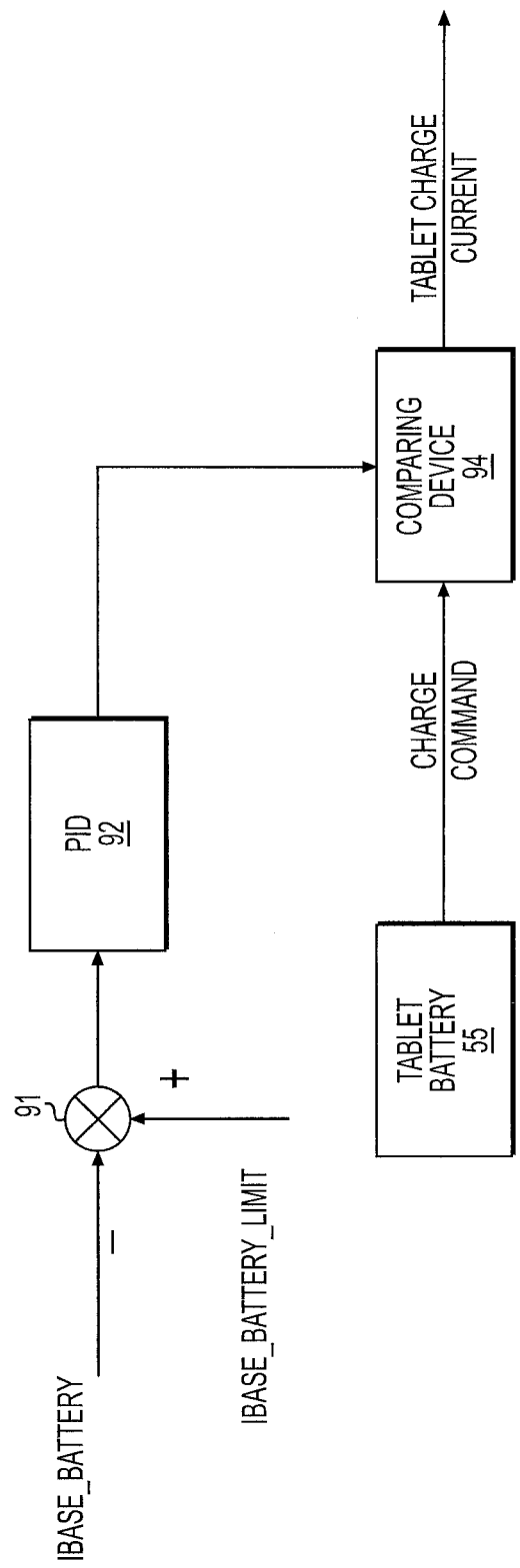
FIG. 3 shows an embedded controller according to an example embodiment.

FIG. 3 shows features of an embedded controller (as well as a tablet battery) according to an example embodiment. Other embodiments and configurations may also be provided. Features of the controller may be hardware, circuit and/or logic, at least a portion of which is hardware.

Embodiments may provide flexible control of platform power and processor performance based on battery conditions.

An input current limit of the tablet charger 52 may be set to a level of a maximum system power (or system peak power). The second power level PL2 may be set such that the total system power is below the battery rated power. The base battery 15 may provide a maximum sustained battery power value that may be used to set the first power level PL1 or the second power level PL2, based on the battery output voltage and resistance.

Embodiments may provide dynamic control of the first power level PL1 and the second power level PL2 based on the measured battery discharge power/current. In order to protect the base battery 15 from a continuous discharge above the sustainable level, embodiments may control the charging of the tablet 50 (and more specifically the charging of the tablet battery 55).

As shown in FIG. 3, the Embedded Controller (EC) may include an adder device 91, a Proportional-Integral-Differential (PID) compensator 92 and a comparing device 94. These features of FIG. 3 may be circuitry and/or logic, at least a portion of which is hardware.

The adder device 91 may receive a measured base battery current $I_{base\_battery}$ value (from the base battery 15) and may receive a maximum sustained output current $I_{base\_battery\_limit}$ value (of the base battery 15). As one example, the maximum sustained output current may be provided in firmware of the embedded controller. The adder device 91 may subtract the measured base battery current $I_{base\_battery}$ value from the maximum sustained current $I_{base\_battery\_limit}$ value, and may provide an input to the PID compensator 92. The input to the PID compensator 92 may be the difference between the maximum sustained output current $I_{base\_battery\_limit}$ value (of the base battery 15) and the measured base battery current $I_{base\_battery}$ value (i.e., $I_{base\_battery\_limit} - I_{base\_battery}$).

An output of the PID compensator 92 may be provided to a first input of the comparing device 94. The tablet battery 55 may provide a charge command (or charge command value) to a second input of the comparing device 94. The comparing device 94 may output a minimum value of the two input value (i.e., a lower value of the two input values). The comparing device 94 may set (or provide) a tablet charge current value. The tablet charge current value may be provided to the tablet charger 52. The tablet charge current value may result in a changing of the battery charging current to the tablet battery 55.

The embedded controller may obtain information relating to the base battery and provide a tablet charge current value to the tablet charger 52. The battery charger 52 may set (or limit) an input battery current (from the base battery) of the battery charger 52. The input battery current may therefore be limited. The tablet battery 55 may be charged based on the input battery current.

A charger device may include a battery charger and an embedded controller, which may be part of or separate from the battery charger (or battery controller). The charger device may obtain information relating to the base battery 15, and may set a battery charge current based on the obtained information, and the set battery charge current may limit an input battery current of the first battery.

The PID compensator 92 may have a very large gain with a fixed delay. The charging by the tablet charger 52 may stop (for 100 ms, for example) when the maximum sustained output current $I_{base\_battery\_limit}$ value (of the base battery 15) is exceeded. The tablet charger 52 may have a soft-start after the measured base battery current $I_{base\_battery}$ value decreases below the limit in order to make the delay shorter.

The PID compensator 92 may also have a small gain and a low-pass filter, and may continuously make charge current decision every prescribed period of time.

In at least one embodiment, data of the measured base battery current $I_{base\_battery}$ value may be obtained from a register of the tablet charger 52 (or from an analog pin of the tablet charger 52).

Embodiments may protect the tablet battery 55 from an over-discharge current, while the system may have maximum possible performance, and the remaining base battery capacity may be used to charge the tablet battery 55. Embodiments may protect the tablet battery 55 from high discharge currents and unnecessary wear-out.

Embodiments may provide flexible control over charging of the tablet battery 55 to limit wear-out of the base battery 15, while providing for maximum system performance. Embodiments may vary or change the charging current of the tablet charger 52 based on the base battery 15 and/or real system power consumption.

Embodiments may provide an embedded controller (or circuitry or logic) to calculate and set up the tablet battery charge current based on a measured base battery current (and/or a reported base battery temperature). The current of the tablet charger may be optimized (using features of FIG. 3 for example) to limit the base battery current to be within prescribed limits, which may be greater than the allowed sustained base battery current. For example, this may allow the base battery current to spike above the sustained level for a brief amount of time.

Embodiments may provide a turbo boost in order to provide better user experience by drastically increasing the processor frequency when there is a thermal margin. The required power consumption of the processor (or the platform or SOC) may drastically exceed the thermal design levels, and total power consumption may exceed the AC adapter capability. A power problem may occur when the system runs off of the battery, and when the active battery is of moderate size and the system must control its turbo mode (or turbo operation) in order to protect the base battery.

Embodiments may rely on two features of a two-battery power delivery system.

A first feature of a two-battery power system is that the first battery (such as a base battery) may have a much better transient and over-current capability than an adapter. The turbo $I_{ccmax}$ spikes may be as long as 10 ms, and the adapters may not be able to support over-current.

A second feature of a two-battery power system is that a Hybrid Power Boost (HPB) circuit may allow the system to isolate the discharged battery, if necessary, to protect the discharged battery from over-discharge, and the system may undervoltage.

Figure 4:
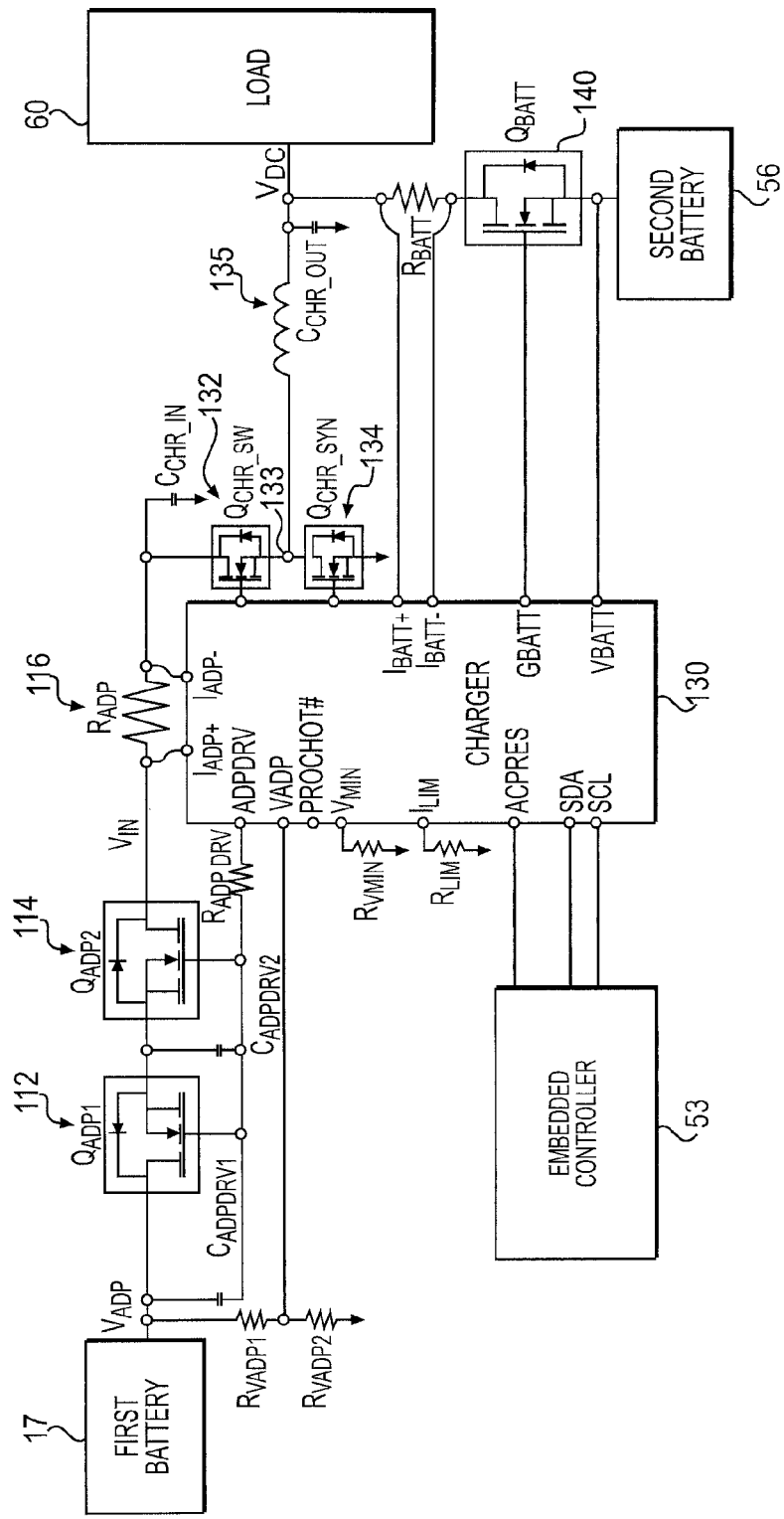
FIG. 4 is a diagram of a power delivery system according to an example embodiment.

FIG. 4 shows a detailed schematic of the tablet charging system, such as for a NVDC system. In this example, the input power source is a first battery 17, such as the base battery 15 shown in FIG. 1, and the output battery 56 is a second battery, such as the tablet battery 55 shown in FIG. 1. Other batteries may also be provided.

In this example, it is assumed that the second battery 56 is discharged, and the second battery 56 may not be used to supplement the first battery 17. The first battery 17 may support the system TDP power, however, the first battery 17 may be too small to support a full turbo mode (or operation), and/or the first battery 17 may be too small to support full system performance and charging of the second battery 56. Embodiments may support a maximum turbo operation, while also charging the second battery 56 at a level supported by the first battery 17.

FIG. 4 shows a power delivery system for an electronic device using a Narrow VDC (NVDC) system. The NVDC system may utilize a power-path selection architecture. The NVDC system may include a battery charger and power-path selection switches.

More specifically, FIG. 4 shows the first battery 17, the embedded controller 53, a charger 130 (or charger controller), the second battery 56 (or battery port) and the load 60. Components of the power delivery system shown in FIG. 4 may be provided within an electronic device, an electronic apparatus and/or an electronic system. The load 60 may correspond to the above described load, platform or SOC.

In FIG. 4, the charger 130 (or charger controller) and the embedded controller 53 may be called a charger device. As will be described below, the charger device may allow the input battery current from the first battery to exceed a set battery charge current based on a discharge current of the second battery.

In the FIG. 4 arrangement, the charger is considered in series with the load 60 (or the system). If the first battery 17 is not connected to the power delivery system, then the power may be provided from the second battery 56.

The system may include a first pass switch 112 and a second pass switch 114 connected in series with the first battery 17. A sense resistor 116 may be provided in series with the first and second pass switches 112, 114. The sense resistor 116 may receive an input voltage Vin.

The charger 130 (or charger controller) may be connected to both ends of the sense resistor 116. The charger 130 (or charger controller) may sense the current (i.e., the adapter current) based on signals received at inputs $I_{ADP+}$ and $I_{ADP-}$ to the charger 130.

A battery switch 140 ($Q_{BATT}$) may be provided between a battery resistor $R_{BATT}$ and the second battery 56 may provide power to the second battery 56. An output signal of the charger 130 ($G_{BATT}$ output) may control the state of the battery switch 140. The battery switch 140 may be turned ON when the first battery 17 is disconnected. The second battery 56 may then provide power to the load 60.

The power delivery system may also include the first and second charger switches 132, 134 provided in series. The first charger switch 132 may be coupled between a voltage rail and the node 133. The second charger switch 134 may be coupled between the node 133 and ground. The first and second charger switches 132, 134 may be independently controlled by the charger 130. The first and second charger switches 132, 134 may be controlled for providing power to the load 60 via an inductor 135 and a voltage rail (shown as $V_{DC}$).

As one example, when the first battery 17 is physically connected to the power delivery system, the first and second pass switches 112, 114 ($Q_{ADP1}$ and $Q_{ADP2}$) may be turned ON by the charger 130 (ADPDRV output), and the charger 130 may provide all the power to the load 60, including charging the second battery 56. The charger 130 (or charger controller) may control the first and second charger switches 132, 134 to convert the power of the first battery 17 to a voltage level of the second battery 56, which is always connected to the load 60. The power from the first battery 17 (and converted to the battery voltage by the charger circuit) may be used to charge the second battery 56 and support the power demand of the load 60 (or system). If the load 60 (or system) power demand exceeds the power capabilities of the first battery 17, then the second battery 56 may automatically supplement the first battery 17.

Embodiments may provide settings in the processor, the charger as well as a new mode of operation of the controller 120.

The second power level PL2 of the processor (i.e., the long-term turbo) may be set to a level below the first battery continuous power minus a remainder of the platform. The second power level PL2 may be lowered based on the discharge of the first battery 17. A fuel gauge, for example, may provide up-to-date maximum sustainable power that the first battery 17 may support. This value may change with the battery discharge as well as with changes in output impedance of the first battery 17.

The input current limit of the charger 130 (such as a tablet charger) may be set to the discharge rated current of the first battery 17. Thus, the continuous battery output power may not exceed its limit, and the charger 130 may not try to draw too much current from the first battery 17 to support the charging and system power.

The Prochot# protection level of the charger 130 may be set to a level of peak current capability of the first battery 17.

The maximum processor current $I_{ccmax}$ of the processor may be set so that the maximum current required by the system, such as the load 60 (or platform or SOC), may be at or below the peak current capability of the first battery 17. This value may be changed in real time, or may be fine-tuned based on the fuel gauge (of the first battery 17) reporting of the maximum power of the first battery 17.

An embodiment may allow a setting of a maximum processor current $I_{ccmax}$ to be above the battery capability minus the peak current of a remainder of the load (or platform or SOC). The Prochot# output of the charger 130 may be used to slow down the processor when the peak current of the first battery 17 exceeds its capability. The embedded controller 53 may include a counter to trigger a lowering of the maximum processor current $I_{ccmax}$ when the Prochot# output has been asserted a prescribed number of times.

The charger 130 may be set such that zero current is allowed to be discharged from the second battery 56. The charger 130 may actively protect the second battery 56 from any discharge, and the input voltage to the power system (the voltage of the tablet battery) may be protected from voltage droop when the input current of the charger 130 exceeds the limit set for the input current. The setting of the charger 130 (or charger controller) for zero discharge current of the tablet battery 56 may override the setting of the maximum input current of the tablet charger 130.

The charger 130 (or the charger controller) may include an HPB emulation mode (or other operation mode). This HPB emulation mode may allow the second battery 56 to be charged during the time when the system power is below the adapter or power capability of the other battery, while the second battery 56 may be protected from over-discharge, as well as the system may be protected from under-voltage during the time when the system power exceeds capability of the adapter or the first battery 17. When the system demands current above the long-term limit for the current of the first battery 17, then the charger 130 may lower the charging current to 0 (or any other level), but the power system may not use the second battery 56 to supplement the first battery 17. The short-duration (10 ms) pulses of the processor may be allowed to pass through, and the level may be below the peak current capability of the base battery (due to setting of the maximum processor current $I_{ccmax}$). The system voltage protection, which may be closely coupled with the output voltage of the tablet battery 56, may take precedence over the tablet charger input current, which may mean that the charger 130 may allow its input current to exceed the set input current limit in order to protect the system voltage from over-droop.

Embodiments may provide a method for the NVDC controller to emulate the HPB method when the second battery 56 is discharged in order to protect the second battery 56 from over-discharge, as well the system from under-voltage, while allowing the battery 56 to be charged when possible given the output power limitations of the base battery 17.

Embodiments may specifically relate to when the second battery 56 is fully discharged, and may allow maximum possible processor performance and continuous charging at available levels of the tablet battery.

Embodiments may provide a HPB emulation mode for the battery charger. During this mode, the system may set up the limit on the discharge current or system voltage. This limit may be set in the battery charger. This limit when crossed may take precedence over the charger input current. In order to protect the system voltage from the over-droop (and/or the battery from over-discharging), the battery charger may allow the charger input current to exceed the current limit. In other words, the charger (or charger controller) may be able to operate as a traditional charger without the ability to supplement the input source. This may allow maximum system performance, while allowing the fastest battery charge when possible.

Embodiments may provide a charger device (such as the battery charger or battery charger controller) to allow the battery charge current to exceed the set limit of the battery charge current based on a discharge current of the second battery.

Embodiments may provide a charger device (such as the battery charger or battery charger controller) to allow the battery charge current to exceed the set limit of the battery charge current based on a load voltage.

Figure 5:
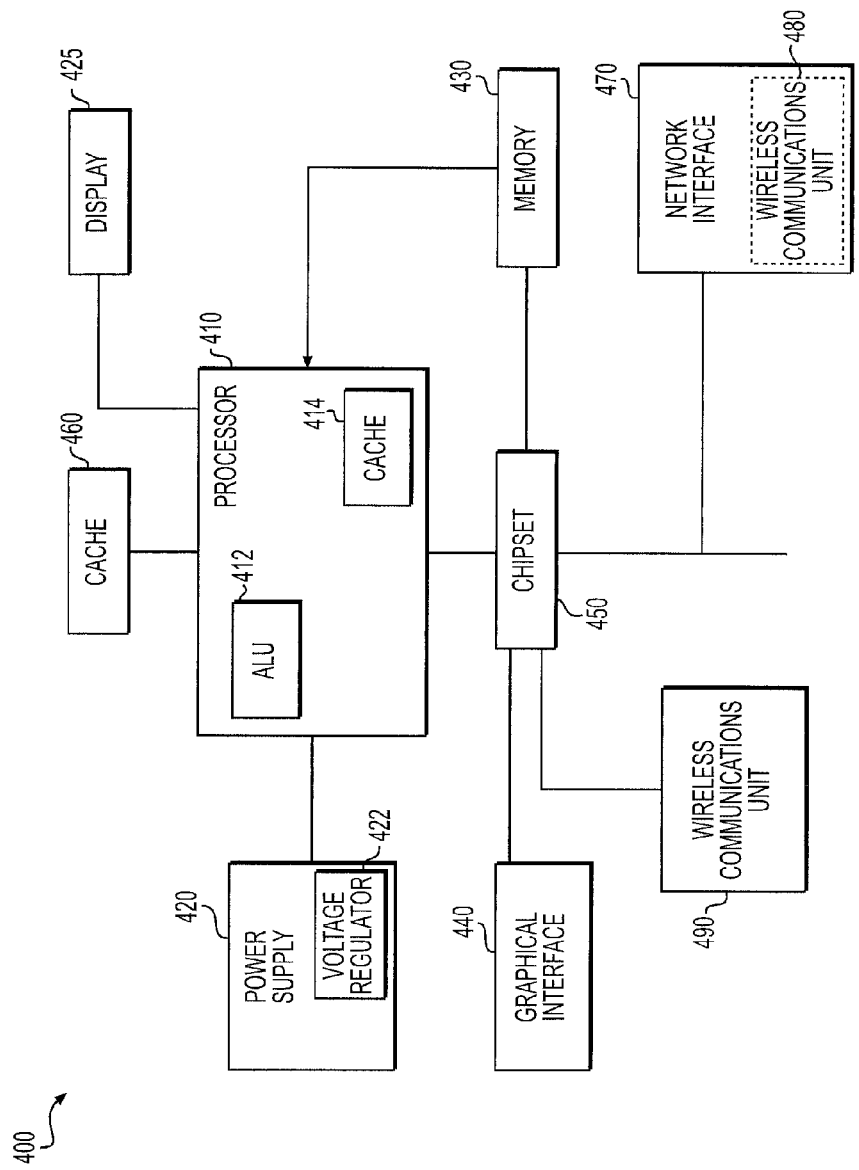
FIG. 5 shows an electronic system according to an example embodiment.

FIG. 5 shows an electronic system according to an example embodiment. Other embodiments and configurations may also be provided. The above described features of a charger device (such as a battery charger and/or embedded controller) may be part of the system shown in FIG. 4.

More specifically, FIG. 5 shows a system 400 that includes a processor 410, a power supply 420, a display 425 and a memory 430, which may be a random access memory, for example. The processor 410 may include an arithmetic logic unit 412 and an internal cache 414, for example. The processor 410 may perform operations discussed above by using received instructions, such as instructions received via a computer-readable medium.

The above-described features may be provided within the electrical system 400 shown in FIG. 4. For example, the battery charger (and/or controller) may be provided as part of the power supply 420 to provide power to any of the components.

The voltage regulator 422 may be part of the power supply 420.

The system 400 may also include a graphical interface 440, a chipset 450, a cache 460, a network interface 470 and a wireless communication unit 480, which may be incorporated within the network interface 470. Alternatively or additionally, a wireless communications unit 490 may be coupled to the processor 410, and a direct connection may exist between the memory 430 and the processor 410.

The processor 410 may be a central processing unit, a microprocessor or any other type of processing or computing circuit and may be included on a chip die with all or any combination of the remaining features, or one or more of the remaining features may be electrically coupled to the microprocessor die through known connections and interfaces. Also, the connections that are shown are merely illustrative as other connections between or among the elements depicted may exist depending, for example, on chip platform, functionality, or application requirements.

In at least one embodiment, a computer-readable medium (or machine-readable medium) may store a program for controlling circuitry or logic to control a charger, such as a battery charger. The program may be stored in a system memory, which for example, may be internal or external. In at least one embodiment, the program may be part of a control algorithm for controlling operations of the charger.

Instructions or code executed by the controller, such as the embedded controller and/or battery charger, may be provided to a memory from a machine-readable medium, or an external storage device accessible via a remote connection (e.g. over a network via an antenna and/or network interface) providing access to one or more electronically-accessible media, etc. A machine-readable medium may include any mechanism that provides (i.e., stores and/or transmits) information in a form readable by a machine (e.g., a computer). For example, a machine-accessible medium may include random access memory (RAM), read only memory (ROM), magnetic or optical storage medium, flash memory devices, electrical, optical, acoustical or other form of propagated signals (e.g., carrier waves, infrared signals, digital signals), etc. In alternative embodiments, hard-wired circuitry may be used in place of or in combination with the instructions or code, and thus the embodiments are not limited to any specific combination of hardware circuitry and software instructions.

The program may include code or instructions to perform any of the operations or functions performed in embodiments previously discussed above.

Example 1 includes an electronic apparatus comprising: a load, a processor to perform an operation on the load, and a charger device to obtain information relating to a first battery, and to set a limit of a battery charge current of a second battery based on the obtained information.

In Example 2, the subject matter of Example 1 can optionally include that the charger device includes a battery charger to charge the second battery based on the set battery charge current.

In Example 3, the subject matter of Example 1 can optionally include that the charger device includes a controller to determine the battery charge current.

In Example 4, the subject matter of Example 1 and Example 3 can optionally include that the charger device includes a battery charger to receive information of the battery charge current and to charge the second battery based on the battery charge current information.

In Example 5, the subject matter of Example 1 and Example 4 can optionally include that the controller to determine the battery charge current based on a measured battery current of the first battery and a sustained output current value of the first battery.

In Example 6, the subject matter of Examples 1-4 can optionally include that the information includes information of a temperature of the first battery.

In Example 7, the subject matter of Examples 1-4 can optionally include that the charger device to allow the battery charge current to exceed the set limit of the battery charge current based on a discharge current of the second battery.

In Example 8, the subject matter of Examples 1-4 can optionally include that the charger device to allow the battery charge current to exceed the set limit of the battery charge current based on a load voltage.

In Example 9, the subject matter of Examples 1-4 can optionally include that the first battery is a battery of a base component.

In Example 10, the subject matter of Examples 1-5 can optionally include that the second battery is a battery of a tablet component.

Example 11 includes an electronic apparatus comprising: a load; a processor to perform an operation on the load; and logic, at least a portion of which is hardware, to obtain information relating to a first battery, and to set a limit of a battery charge current of a second battery based on the obtained information.

In Example 12, the subject matter of Example 11 can optionally include that the logic includes a battery charger to charge the second battery based on the set battery charge current.

In Example 13, the subject matter of Example 11 can optionally include that the logic includes a controller to determine the battery charge current.

In Example 14, the subject matter of Example 11 and Example 13 can optionally include that the logic includes a battery charger to receive information of the battery charge current and to charge the second battery based on the battery charge current information.

In Example 15, the subject matter of Example 11 and Example 14 can optionally include that the controller to determine the battery charge current based on a measured battery current of the first battery and a sustained output current value of the first battery.

In Example 16, the subject matter of Examples 11-15 can optionally include that the information includes information of a temperature of the first battery.

In Example 17, the subject matter of Examples 11-15 can optionally include that the logic to allow the battery charge current to exceed the set limit of the battery charge current based on a discharge current of the second battery.

In Example 18, the subject matter of Examples 11-15 can optionally include that the logic to allow the battery charge current to exceed the set limit of the battery charge current based on a load voltage.

In Example 19, the subject matter of Examples 11-15 can optionally include that the first battery is a battery of a base component.

In Example 20, the subject matter of Examples 11-15 can optionally include that the second battery is a battery of a tablet component.

Example 21 is an electronic system comprising: a first component having a first battery; and a second component having a second battery, the first component to detach from the first component and to couple to the second component, the second component including: a load, a processor to perform an operation with respect to the load, and a charger device to obtain information relating to the first battery, and to set a limit of a battery charge current of a second battery based on the obtained information.

In Example 22, the subject matter of Example 21 can optionally include that the charger device includes a battery controller to charge the second battery based on the set battery charge current.

In Example 23, the subject matter of Example 21 can optionally include that the charger device includes a controller to determine the battery charge current.

In Example 24, the subject matter of Example 21 and Example 23 can optionally include that the charger device includes a battery charger to receive information of the battery charge current and to charge the second battery based on the battery charge current information.

In Example 25, the subject matter of Example 21 and Example 24 can optionally include that the controller to determine the battery charge current based on a measured battery current of the first battery and a sustained output current value of the first battery.

In Example 26, the subject matter of Examples 21-24 can optionally include that the information includes information of a temperature of the first battery.

In Example 27, the subject matter of Examples 21-24 can optionally include that the charger device to allow the battery charge current to exceed the set limit of the battery charge current based on a discharge current of the second battery.

In Example 28, the subject matter of Examples 21-24 can optionally include that the charger device to allow the battery charge current to exceed the set limit of the battery charge current based on a load voltage.

Example 29 is an electronic apparatus comprising: a load; a processor to perform an operation on the load; first means for obtaining information relating to a first battery; and second means for setting a limit of a battery charge current of a second battery based on the obtained information.

In Example 30, the subject matter of Example 29 can optionally include that the second means includes a battery charger to charge the second battery based on the set battery charge current.

In Example 31, the subject matter of Example 29 can optionally include that the first means includes a controller to determine the battery charge current.

In Example 32, the subject matter of Example 29 and Example 31 can optionally include that the second means includes a battery charger to receive information of the battery charge current and to charge the second battery based on the battery charge current information.

In Example 33, the subject matter of Example 29 and Example 32 can optionally include that the controller to determine the battery charge current based on a measured battery current of the first battery and a sustained output current value of the first battery.

In Example 34, the subject matter of Examples 29-32 can optionally include that the information includes information of a temperature of the first battery.

In Example 35, the subject matter of Examples 29-32 can optionally include that the second means to allow the battery current to exceed the set limit of the battery charge current based on a discharge current of the second battery.

In Example 36, the subject matter of Examples 29-32 can optionally include that the second means to allow the battery current to exceed the set limit of the battery charge current based on a load voltage.

In Example 37, the subject matter of Examples 29-32 can optionally include that the first battery is a battery of a base component.

In Example 38, the subject matter of Examples 29-32 can optionally include that the second battery is a battery of a tablet component.

Example 39 is a machine-readable medium comprising one or more instructions that when executed cause a controller to perform one or more operations to: obtain information relating to a first battery; and set a limit of a battery charge current of a second battery based on the obtained information.

In Example 40, the subject matter of Example 39 can optionally include one or more instructions that when executed on a controller to charge the second battery based on the set battery charge current.

In Example 41, the subject matter of Example 39 can optionally include one or more instructions that when executed on a controller to determine the battery charge current.

In Example 42, the subject matter of Example 39 and Example 41 can optionally include to obtain the information includes to receive information of the battery charge current.

In Example 43, the subject matter of Example 39 and Example 42 can optionally include one or more instructions that when executed on a controller to charge the second battery based on the battery charge current information.

In Example 44, the subject matter of Example 39 and Example 41 can optionally include one or more instructions that when executed on a controller to determine the battery charge current based on a measured battery current of the first battery and a sustained output current value of the first battery.

In Example 45, the subject matter of Examples 39-42 can optionally include that the information includes information of a temperature of the first battery.

In Example 46, the subject matter of Examples 39-42 can optionally include one or more operations that when executed on a controller to allow the battery charge current to exceed the limit of the set battery charge current based on a discharge current of the second battery.

In Example 47, the subject matter of Examples 39-42 can optionally include one or more operations that when executed on a controller to allow the battery charge current to exceed the limit of the set battery charge current based on a load voltage.

In Example 48 the subject matter of Examples 39-42 can optionally include that the first battery is a battery of a base component.

In Example 49, the subject matter of Examples 39-42 can optionally include that the second battery is a battery of a tablet component.

Example 50 is a method of charging an electronic device comprising: obtaining information relating to a first battery; and setting a limit of a battery charge current of a second battery based on the obtained information.

In Example 51, the subject matter of Example 50 can optionally include charging the second battery of the electronic device based on the set battery charge current.

In Example 52, the subject matter of Example 50 can optionally include determining the battery charge current.

In Example 53, the subject matter of Example 50 and Example 52 can optionally include receiving information of the battery charge current and charging the second battery based on the battery charge current information.

In Example 54, the subject matter of Example 50 and Example 53 can optionally include determining the battery charge current based on a measured battery current of the first battery and a sustained output current value of the first battery.

In Example 55, the subject matter of Examples 50-53 can optionally include that the information includes information of a temperature of the first battery.

In Example 56, the subject matter of Examples 50-53 can optionally include allowing the battery charge current to exceed the set limit of the battery charge current based on a discharge current of the second battery.

In Example 57, the subject matter of Examples 50-53 can optionally include allowing the battery charge current to exceed the set limit of the battery charge current based on a load voltage.

In Example 58, the subject matter of Examples 50-53 can optionally include that the first battery is a battery of a base component.

In Example 59, the subject matter of Examples 50-53 can optionally include that the second battery is a battery of a tablet component.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic apparatus comprising:
   a load;
   a processor to perform an operation on the load; and
   a charger device to obtain information relating to a first battery, and to set a limit of a battery charge current to a second battery based on a measured battery current of the first battery, wherein the charger device is to determine the battery charge current to the second battery based at least in part on a difference between the measured battery current of the first battery and a maximum sustained output current value of the first battery, wherein the charger device is to control the battery charge current to the second battery such that the battery charge current is to exceed the set limit of the battery charge current to the second battery based on a discharge current of the second battery.

2. The electronic apparatus of claim 1, wherein the charger device includes a battery charger to receive information of the battery charge current and to charge the second battery based on the battery charge current information.

3. The electronic apparatus of claim 1, wherein the information includes information of a temperature of the first battery.

4. The electronic apparatus of claim 1, wherein the charger device is to control the battery charge current to exceed the set limit of the battery charge current to the second battery based on a load voltage.

5. An electronic apparatus comprising:
   a load;
   a processor to perform an operation on the load; and
   logic, at least a portion of which is hardware, to obtain information relating to a first battery, and to set a limit of a battery charge current to a second battery based on a measured battery current of the first battery and a temperature of the first battery, wherein the logic includes a controller to determine the battery charge current to the second battery, wherein the controller is to determine the battery charge current to the second battery based at least in part on a difference between the measured battery current of the first battery and a maximum sustained output current value of the first battery, and wherein the logic is to control the battery charge current to the second battery such that the battery charge current is to exceed the set limit of the battery charge current to the second battery based on a discharge current of the second battery.

6. The electronic apparatus of claim 5, wherein the logic includes a battery charger to charge the second battery based on the set battery charge current.

7. The electronic apparatus of claim 5, wherein the logic includes a battery charger to receive information of the battery charge current and to charge the second battery based on the battery charge current information.

8. The electronic apparatus of claim 5, wherein the information includes information of the temperature of the first battery.

9. The electronic apparatus of claim 5, wherein the logic to control the battery charge current is to exceed the set limit of the battery charge current to the second battery based on a load voltage.

10. An electronic system comprising:
    a first component having a first battery; and
    a second component having a second battery, the second component to detach from the first component and to couple to the first component, the second component including:
    a load,
    a processor to perform an operation with respect to the load, and
    a charger device to obtain information relating to the first battery, and
    to set a limit of a battery charge current to a second battery based on a measured battery current of the first battery and a temperature of the first battery, wherein the charger device is to determine the battery charge current to the second battery based at least in part on a difference between the measured battery current of the first battery and a maximum sustained output current value of the first battery, wherein the charger device is to control the battery charge current to the second battery such that the battery charge current is to exceed the set limit of the battery charge current to the second battery based on a discharge current of the second battery.

11. The electronic system of claim 10, wherein the charger device includes a controller to determine the battery charge current.

12. The electronic system of claim 11, wherein the charger device includes a battery charger to receive information of the battery charge current and to charge the second battery based on the battery charge current information.

13. The electronic system of claim 10, wherein the charger device to control the battery charge current is to exceed the set limit of the battery charge current to the second battery based on a load voltage.

14. The electronic apparatus of claim 3, wherein the charger device is to set the limit of the battery charge current to the second battery based at least in part on the temperature of the first battery.

15. The electronic apparatus of claim 8, wherein the logic is to set the limit of the battery charge current to the second battery based at least in part on the temperature of the first battery.

* * * * *